2,973,571
Patented Mar. 7, 1961

2,973,571
CURRENT CONDUCTOR

Jan Laurens Meyering, Eindhoven, Netherlands, assignor, by mesne assignments, to North American Philips Company, Inc., New York, N.Y., a corporation of Delaware No Drawing. Filed Aug. 26, 1954, Ser. No. 452,443

Claims priority, application Netherlands Sept. 15, 1953

2 Claims. (Cl. 29—194)

It has already been suggested to coat the surface of current conductors prior to these being sealed to glass with thin layers of a metal different from that of which the core of the current conductor consists, for example, the current conductor may be coated with a chromium layer to obtain a better adhesion to glass or with a noble metal layer to reduce oxidation. It is also known to coat current conductors the core of which consists of an iron-nickel alloy with thin layers of silver, gold or copper or alloys thereof and subsequently to coat such a layer with an outer layer of iron, nickel, cobalt, platinum or alloys thereof. This would result in satisfactory adhesion of the outer layer to the current conductor.

Although the suggested current conductor are satisfactory in several respects, diffusion of the core metal of the current conductor to the outer surface or diffusion of oxygen through the outer layer to the core of the current conductor respectively is not always prevented. This diffusion results in the occurrence of undesired oxidation phenomena. It is an object of the present invention to obviate this disadvantage.

According to the invention a current conductor the core of which consists of one or more of the metals iron, chromium, nickel, cobalt, titanium or zirconium and which during operation is not exposed to a high temperature is characterized in that the metal core is covered with at least two metal layers alternately consisting of silver and gold.

An explanation of the fact that such layers consisting alternately of silver and gold prevent oxygen from diffusing to the core and the core metal from diffusing to the surface consists, for example, in the fact that gold is substantially impermeable to oxygen and that the metal of a core consisting of iron, chromium, nickel, cobalt, titanium or zirconium substantially does not diffuse through a silver layer.

In a preferred embodiment of the invention such a combination of successive silver and gold layers is chosen that in the case of two successive layers the layer nearest to the core metal consists of silver and the next layer of gold. Such a sequence of layers has the advantage that the possibility that between the silver and gold layer an oxide layer is produced by diffusion of core metal and oxygen is very slight.

If it is desirable for current supply wires manufactured by carrying out the process according to the invention to have good conductivity for high frequency currents it is advantageous that the outer layer consists of silver.

Although the adhesion of silver to the said core metals is also satisfactory, it was found that by the use of gold as the inner coating layer better adhesion was obtained.

As examples of the above-described invention we may mention current supply wires made of iron and coated with an inner layer of gold, a second layer of silver, and an outer layer of gold and also iron wires successively coated with layers of gold, silver, gold, silver.

The gold and silver layers can be applied to the core by electro deposition. As an alternative, other methods may also be used, for example deposition from vapour or cataphoresis.

The thickness of the metal layers may vary, for example, between $0.1\mu$ and $100\mu$, preferably, however, they are from 1 to $10\mu$ thick.

Current supply wires in accordance with the invention are highly suited to being sealed-in in glass in a vacuum-tight manner and for use in manufacturing electron tubes, more particularly tubes used in the manufacture of radar equipment.

What is claimed is:

1. A current conductor comprising a center portion consisting of a metal selected from the group consisting of iron, chromium, nickel, cobalt, titanium, zirconium and mixtures thereof and a layer of gold adjacent to and surrounding said center portion, a layer of silver adjacent to and surrounding said gold layer and a second layer of gold adjacent to and surrounding said silver layer.

2. A current conductor comprising a center portion consisting of a metal selected from the group consisting of iron, chromium, nickel, cobalt, titanium, zirconium and mixtures thereof and a layer of gold adjacent to and surrounding said center portion, a layer of silver adjacent to and surrounding said gold layer, a second layer of gold adjacent to and surrounding said silver layer and a second layer of silver adjacent to and surrounding said latter gold layer.

References Cited in the file of this patent

UNITED STATES PATENTS

| | | |
|---|---|---|
| 1,738,828 | Jackson | Dec. 10, 1929 |
| 1,904,241 | Kammerrer | Apr. 18, 1933 |
| 2,393,905 | Hensel | Jan. 29, 1946 |
| 2,429,222 | Ehrhardt | Oct. 21, 1947 |
| 2,608,753 | Mooradian | Sept. 2, 1952 |